(No Model.)

E. M. SOUTH.
CORN PLANTER.

No. 332,679. Patented Dec. 15, 1885.

Witnesses:

Edward M. South, Inventor
by James M. See, Attorney

UNITED STATES PATENT OFFICE.

EDWARD M. SOUTH, OF HAMILTON, OHIO, ASSIGNOR TO HENRY P. DEUSCHER, OF SAME PLACE.

CORN-PLANTER.

SPECIFICATION forming part of Letters Patent No. 332,679, dated December 15, 1885.

Application filed August 10, 1885. Serial No. 173,969. (No model.)

*To all whom it may concern:*

Be it known that I, EDWARD M. SOUTH, of Hamilton, Butler county, Ohio, have invented certain new and useful Improvements in Corn - Planters, of which the following is a specification.

My invention relates to improvements in the construction of the furrowing device invented and patented by Henry Farmer, of Richmond, Indiana, as shown in Letters Patent No. 246,106, granted to him August 23, 1881, and in Letters Patent No. 274,580, granted to him and Henry P. Deuscher, of Hamilton, Ohio, March 27, 1883.

My improvements will be readily understood from an inspection of the two patents referred to in connection with the following description and its accompanying drawings, in which:—

Figure 1:
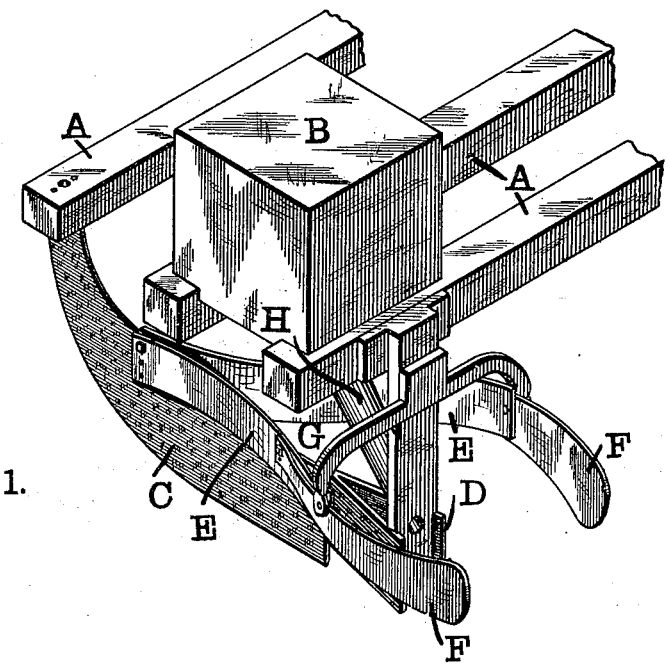
Figure 2:
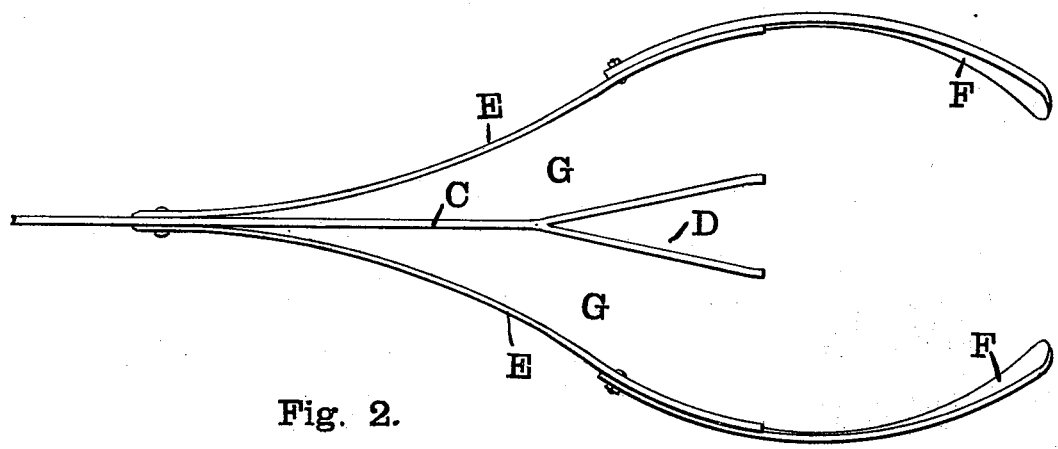

Figure 1 is a perspective view of the left-hand end of the runner-frame of a corn-planter of the class referred to; and Fig. 2, an enlarged plan of one of the runners with the fenders, &c., attached.

In the drawings, A represents portions of the usual frame-pieces of a runner-frame; B, one of the seed-boxes supported by said frame and intended to be provided with any of the usual seed-valve mechanisms; C, a furrowing-runner consisting of a flat runner - formed blade having its forward end attached to the front piece of the frame, and having its rear end secured to a hanger attached also to the frame; D, the bifurcated heel of the runner, such heel serving in opening the furrow, which has been cut by the body portion of the runner; E, clod - fenders consisting of a pair of strips having their forward ends attached to the runner and having their rear ends attached to an arch-piece, which is secured indirectly to the runner - frame; F, covering-blades attached to the clod-fenders and projecting to the rear of the fenders and runner; G, the spaces between the side surfaces of the runner and the interior surfaces of the fenders, and H the seed-spout leading from the seed-box to the rear of the runner. The runner cuts the furrow, the bifurcated heel of the runner opens the furrow, the fenders keep clods from disturbing the furrow while being formed, the seed-spout delivers the seed into the furrow immediately at the rear of the runner, the covering-blades close the furrow up after the seed has been dropped, and the furrows are usually pressed by the wheels of the frame articulated to the rear of the runner-frame.

Heretofore the fenders have been found harmful rather than useful in certain classes of heavy soil, owing to the liability of the soil to clog in the spaces between the sides of the runner-heel and the inside surfaces of the fender.

In the device now being described the fenders are so formed in curves as to present convexities toward the runner for most of the length of the fender and concavities at their extreme rearward ends—that is, the forward portions of the fender present an outward hollow curve and the rear portions of the fenders present an inward hollow curve. The spaces G, between the runners and fenders, constantly increase in width toward the rear, whereby all clogging in this is avoided.

I claim as my invention—

In a corn - planter, the combination of a runner - shaped furrowing-blade, C, having a widened heel at its rear end, and the fenders E, having their forward ends secured to the forward portion of the furrowing-blade and formed to present convex curves toward the furrowing-blade forward of the point where the furrowing-blade widens, and having their rear ends presenting concave curves inward, substantially as and for the purpose set forth.

EDWARD M. SOUTH.

Witnesses:
J. W. SEE,
W. A. SEWARD.